(12) United States Patent
Bogenrieder et al.

(10) Patent No.: US 8,864,169 B2
(45) Date of Patent: Oct. 21, 2014

(54) VALVE DEVICE FOR A MEDIUM AND AIRBAG FOR A MOTOR VEHICLE

(75) Inventors: Ralf Bogenrieder, Stuttgart (DE); Christian Burczyk, Stuttgart (DE); Andreas Hirth, Dielheim (DE); Lutz Quarg, Boeblingen (DE); Friedrich Reiter, Sindelfingen (DE); Thomas Stegmaier, Denkendorf (DE)

(73) Assignee: Daimler AG, Stuttgart (DE)

( * ) Notice: Subject to any disclaimer, the term of this patent is extended or adjusted under 35 U.S.C. 154(b) by 22 days.

(21) Appl. No.: 13/578,492

(22) PCT Filed: Jan. 27, 2011

(86) PCT No.: PCT/EP2011/000355
§ 371 (c)(1),
(2), (4) Date: Nov. 1, 2012

(87) PCT Pub. No.: WO2011/098218
PCT Pub. Date: Aug. 18, 2011

(65) Prior Publication Data
US 2013/0049337 A1    Feb. 28, 2013

(30) Foreign Application Priority Data
Feb. 13, 2010   (DE) .......................... 10 2010 007 881

(51) Int. Cl.
*B60R 21/30* (2006.01)
*B60R 21/235* (2006.01)
*B60R 21/239* (2006.01)

(52) U.S. Cl.
CPC ..... *B60R 21/239* (2013.01); *B60R 2021/23509* (2013.01); *B60R 2021/2395* (2013.01); *B60R 21/235* (2013.01)
USPC .......................................................... 280/739

(58) Field of Classification Search
USPC ................................ 280/739, 740, 742, 743.1
See application file for complete search history.

(56) References Cited

U.S. PATENT DOCUMENTS

| | | | | | |
|---|---|---|---|---|---|
| 3,887,213 | A | * | 6/1975 | Goetz | 280/739 |
| 7,118,127 | B2 | * | 10/2006 | Damm | 280/739 |
| 7,543,849 | B2 | * | 6/2009 | Bradburn | 280/739 |
| 2003/0166367 | A1 | | 9/2003 | Berger et al. | |
| 2006/0131856 | A1 | | 6/2006 | Heist et al. | |
| 2006/0202452 | A1 | | 9/2006 | Breed et al. | |

FOREIGN PATENT DOCUMENTS

| | | |
|---|---|---|
| DE | 20 2004 019 445 U1 | 5/2006 |
| WO | WO 02/28689 A1 | 4/2002 |

OTHER PUBLICATIONS

Corresponding International Search Report with English Translation dated Apr. 21, 2011 (four (4) pages).
Form PCT/ISA/237 (six (6) pages).

* cited by examiner

*Primary Examiner* — Paul N Dickson
*Assistant Examiner* — Robert A Coker
(74) *Attorney, Agent, or Firm* — Crowell & Moring LLP

(57) ABSTRACT

A valve device for a gaseous medium of an airbag is provided. The valve device includes a textile layer, in particular a woven fabric, which is permeable with respect to the medium at least in certain regions. The valve device also includes at least one film covering the textile layer in at least one region and which forms at least one passage region of the valve device, which is at least substantially closed in a closed position of the valve device and open at least in certain regions in an at least temporary passage position of the valve device.

8 Claims, 5 Drawing Sheets

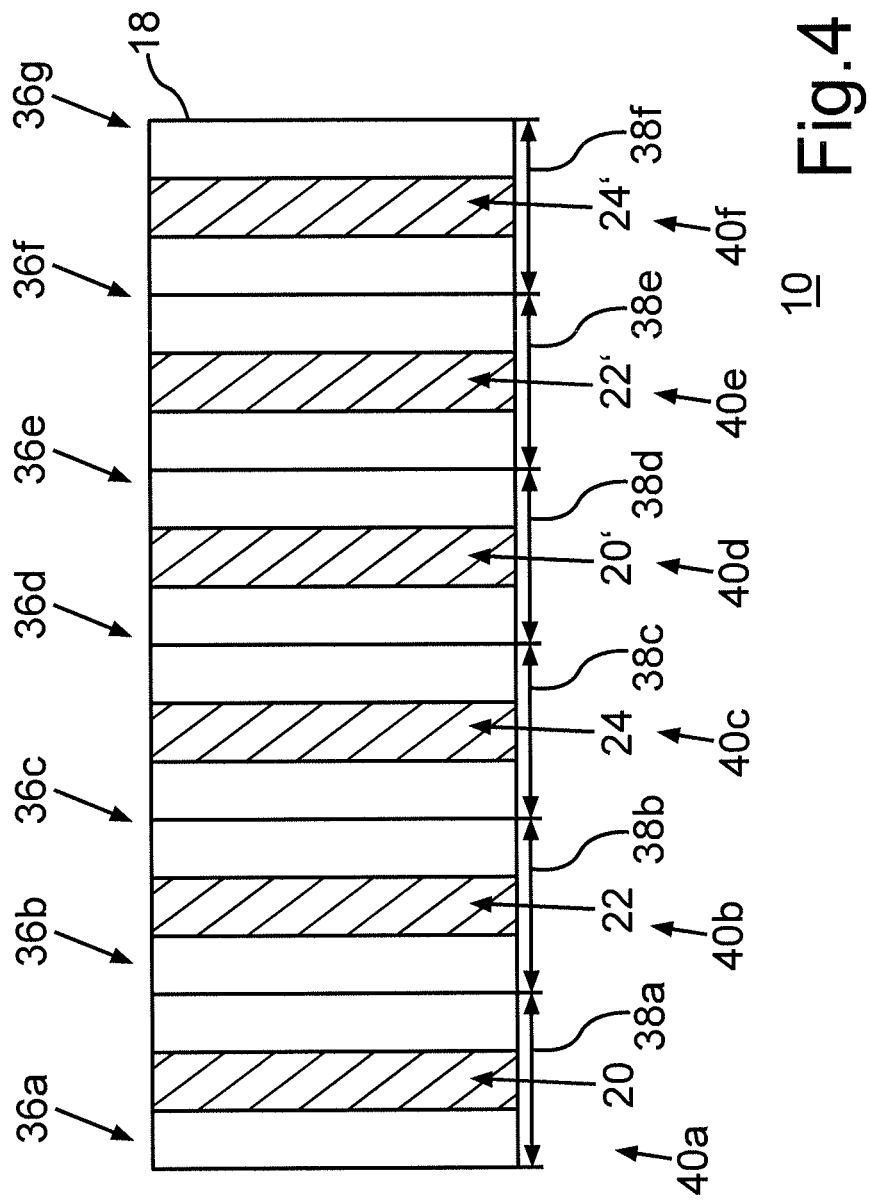

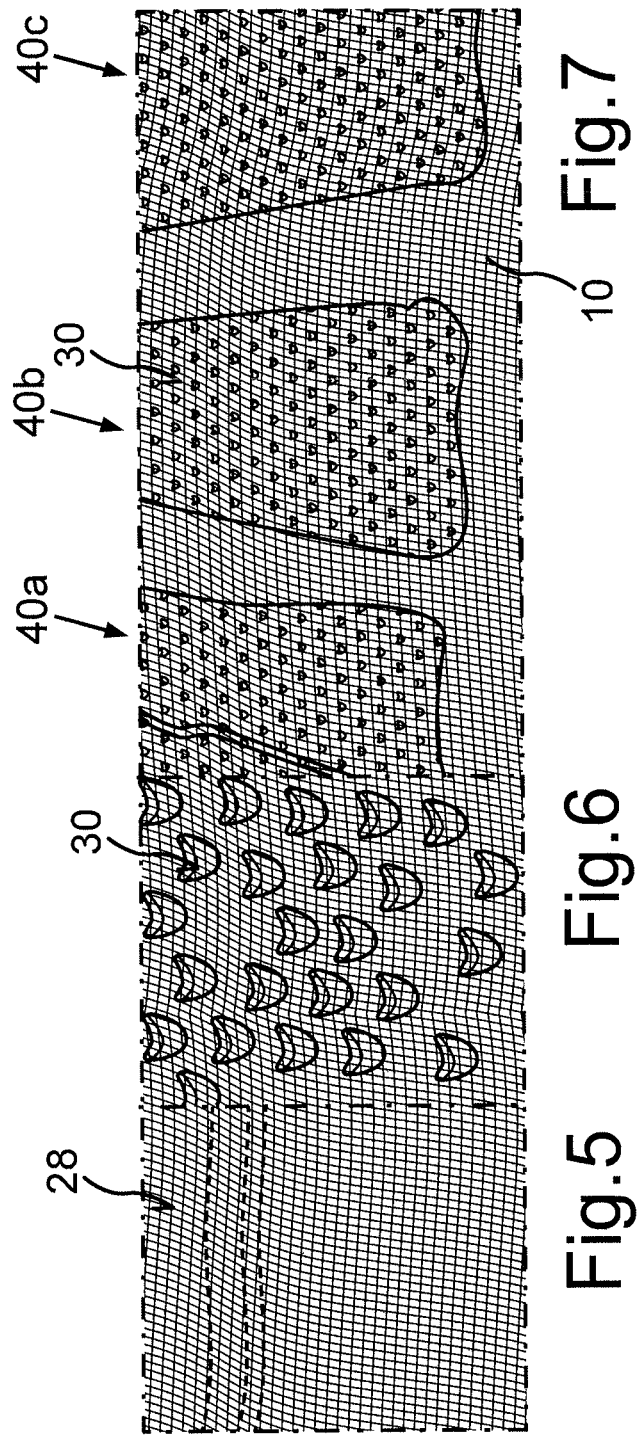

VALVE DEVICE FOR A MEDIUM AND AIRBAG FOR A MOTOR VEHICLE

BACKGROUND AND SUMMARY OF THE INVENTION

The invention relates to a valve device for a medium and to an airbag for a motor vehicle.

From standard motor vehicle production, protective devices are known that include so-called airbags, which containers for air of which at least the volume can be varied. If the motor vehicle hits a barrier, these are inflated within a very short time by means of a gas discharge.

The purpose of this is the protection of occupants of the motor vehicle against hitting components in an occupant cell of the motor vehicle. Because such an impact leaves very little time for inflation this inflation and the corresponding protective function have to be available within a very short time.

Exemplary embodiments of the present invention are directed to a valve device for a medium and an airbag that allows the medium to very fast and efficiently flow through the valve device and in the airbag.

The valve device according to the invention for a medium, in particular for a gaseous medium of an airbag, comprises a textile layer, in particular a woven fabric, which permeable with respect to the medium at least in certain regions, and at least one film which covers the textile layer in at least one region. This film creates at least one passage region of the valve device that is at least substantially closed in a closed position of the valve device and at least substantially prevents a passage of the medium through the valve device. In an at least temporary passage position of the valve device, the passage region is open at least in certain regions and allows a passage of the medium through the valve device.

Such a valve function of the valve device and in particular of the film allows a particularly good, fast and efficient passage of a large quantity or volume of medium through the valve device in a very short time, which offers great advantages if the valve device is used in an airbag, because such an airbag has to be filled within a very short time with a specific quantity of the medium, in particular air, in order to ensure a high and fast volume increase to protect occupants of a motor vehicle with such an airbag. The valve device according to the invention can, however, be used in various other applications in which a valve function is desirable.

In addition to its excellent functionality, the valve device according to the invention offers the advantage that it has a very low weight and only a small pack volume. This is due to the fact that the film and the textile layer are extremely thin and light-weight. The costs of the valve device according to the invention are extremely low as well, because both the film and the textile layer can be produced fast and cost-effectively in bulk.

It should be noted here that the film is at least substantially impermeable to the medium, for example air. The medium can therefore only flow through the valve device by way of the passage region while being unable to flow through the valve device in other regions, being essentially prevented by the film.

The valve device according to the invention can be used in protective devices comprising at least one airbag, the airbag being, for example, a large continuous unit which, in an inflated state, occupies a defined, preferably large, volume in the interior of the motor vehicle. In such an application the valve device is used to let a desired quantity or volume of air flow into the airbag in the passage position when the airbag is inflated, i.e., its volume is increased. If the airbag is inflated and hit by an occupant, the valve device at least substantially retains the air in the airbag in its closed position and prevents a discharge and/or an excessively fast discharge of the medium from the airbag in order to provide a defined and desired support by the airbag.

The valve device according to the invention can also be used in a so-called truss airbag, which for example has a truss structure which is formed of a plurality of tubular elements of variable volume and which, if a force is applied to the motor vehicle in an accident, is inflated and occupies a defined volume in the interior of the motor vehicle. Compared to the continuous airbag described above, such a truss airbag offers the advantage that, while the truss structure is able to occupy as large a volume in the interior as the airbag described above and therefore provides equally good support, the overall volume to be filled with medium, i.e., to be inflated, is smaller. In other words, the sum of individual volumes of the tubular elements can be less than a volume of the large continuous airbag, but, owing to the truss structure provided by the tubes, the airbag can occupy at least as large a volume in the interior as the continuous airbag and can therefore offer the same support and protective function for the occupants.

To improve its support function, the truss structure is, for example, provided with a cover, in particular with a woven fabric, so that the truss structure and the cover form an interior of the truss airbag that is filled with a medium, for example air, and in particular ambient air, in order to improve the support function of the truss airbag even further. The cover of the truss airbag is advantageously at least partially represented by the valve device according to the invention, which therefore allows the interior bounded by the truss structure and the cover to be filled with a large quantity of medium, in particular ambient air, within a short time. The interior is therefore to be considered analogous to the large continuous airbag described above and offers at least as good a support and protective function, but the truss airbag can make these functions available within a shorter time. This means that it can occupy a larger volume than the continuous airbag within the same time, therefore offering an improved support and protective function. But even in the large continuous airbag which is at least partially represented by the valve device, the valve device according to the invention offers the advantage that the large continuous airbag can be filled with a particularly great quantity or volume of the medium within a very short time.

In view of this, it is obvious that the valve device according to the invention can be integrated into the continuous and/or truss airbag in a particularly simple and cost-effective way and in addition forms a homogenous surface that prevents or at least reduces the risk of injury to an occupant, in particular in the head region, if the occupant hits the airbag.

In one embodiment of the invention, the passage region described above is designed as a through-opening of the film, which is, for example, represented by a perforation. Such a perforation can be, for example, provided during the production of the film by means of a porcupine which forms a plurality of such perforations in the film, resulting in a particularly cost-effective production process and a highly efficient and excellent valve function of the valve device according to the invention.

In an advantageous variant of the invention, at least one flap element corresponding to the at least one through-opening of the film is provided, which flap element opens the at least one through-opening in the at least temporary passage position of the valve device at least in certain regions and closes it in the closed position of the valve device at least in certain regions. The flap element is advantageously designed as a single piece with the film, resulting in a low number of components and therefore in a low weight and low costs of the valve device.

As an alternative or in addition, it can be provided in a further embodiment of the invention that the passage region is represented by at least one film region that can be lifted off the textile layer in the passage position. To improve its tightness in the closed position, this passage region is in one embodiment closed by at least two film regions that overlap in the closed position of the valve device. This means that the film has at least two overlapping regions, which in turn cover a region of the textile layer. The overlapping film regions open up the region of the textile layer in the passage position of the valve device at least in certain regions while at least substantially closing it in the closed position of the valve device. This enables the medium to flow through the valve device particularly efficiently and well, while efficiently and effectively preventing a flow of medium in the opposite direction.

The invention further includes an airbag for a motor vehicle provided with at least one valve device according to the invention. Advantageous variants of the valve device according to the invention should be considered as advantageous variants of the airbag according to the invention and vice versa. As explained in the context of the valve device according to the invention, the airbag according to the invention can be filled with a very large quantity or volume of medium within a particularly short time, allowing its volume to be increased within a particularly short time to provide an excellent support and protective function for occupants of the motor vehicle. This applies both to large continuous airbags and to truss airbags as well as to any other airbag designs.

Further advantages, features and details of the invention can be derived from the following description of several preferred embodiments and from the drawings. The features and combinations of features referred to above and the features and combinations of features mentioned in the description of the figures and/or shown in the figures only can be used not only in the stated combination, but also on other combinations or individually, without leaving the scope of the invention.

BRIEF DESCRIPTION OF THE DRAWINGS

Of the drawings:

FIG. 4 is a diagrammatic top view of a further embodiment of the valve device according to the invention;

FIG. 5 is a section of a diagrammatic top view of an outside of the valve device according to the invention as shown in the preceding figures;

FIG. 6 is a section of a diagrammatic top view of an inside of the valve device according to FIG. 3; and FIG. 7 is a section of a diagrammatic perspective view of an inside of the valve device according to FIG. 4.

DETAILED DESCRIPTION

Figure 1:
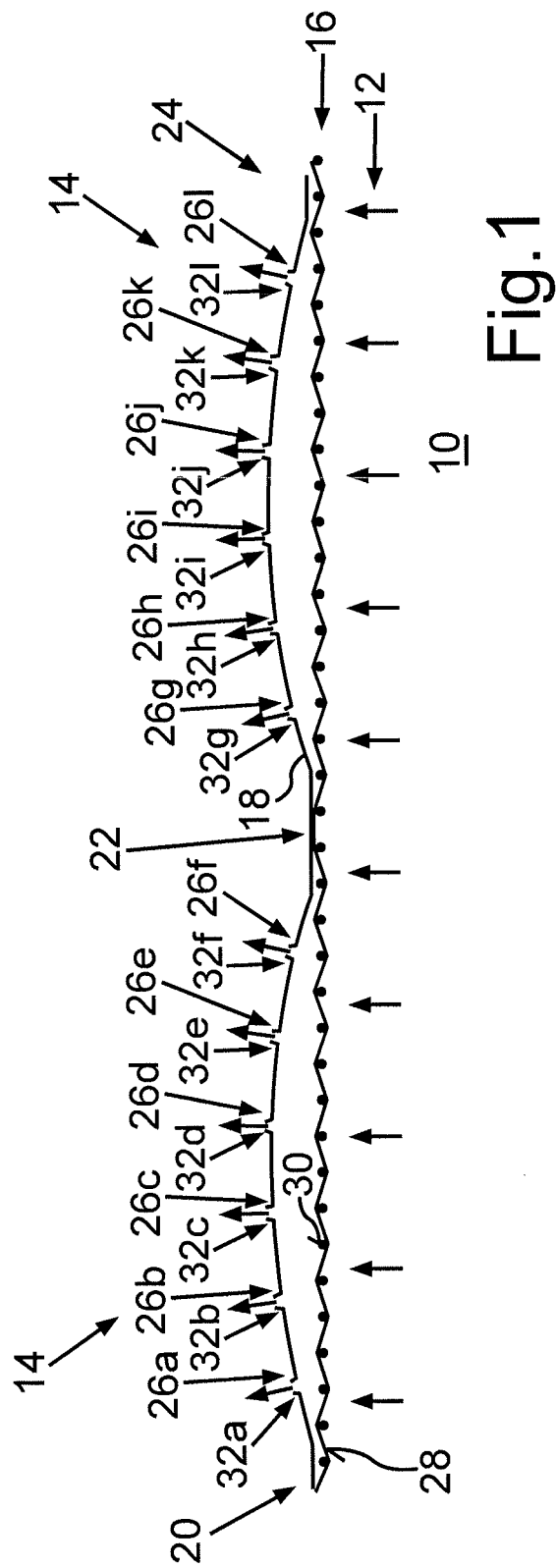
FIG. 1 is a diagrammatic sectional view of an embodiment of the valve device according to the invention.

FIG. 1 shows a valve device 10 for the air of an airbag, which air flows into the airbag in the direction indicated by the arrows 12 and 14 while the volume of the airbag is increased, in particular while the airbag is being inflated as forces act on a motor vehicle equipped with the airbag in an accident.

The valve device 10 has an air-permeable textile layer in the form of a woven fabric 16 formed from a plurality of interwoven threads. The valve device 10 further comprises a film 18 that is joined, for example bonded and/or sewn, to the woven fabric 16 in the regions 20, 22 and 24. The woven fabric 16 acts as a support fabric to ensure a secure shape retention and stability of the valve device 10.

To enable the air to flow through the valve device 10 in a passage position and thus to enable it to flow into the airbag, the film has passage regions in the form of through-openings 26a-l, which are open at least in certain regions in the passage position of the valve device 10 and at least substantially closed in a closed position of the valve device 10, thereby preventing a discharge or an excessively fast discharge of air from the airbag in order to ensure a desired and specific dwell time of the airbag to support the occupants of the motor vehicle.

The through-openings 26a-l are formed, for example, by means of a porcupine that perforates the film 18 before the film 18 (which is for example at least substantially made of silicone) is joined to the supporting woven fabric 16. The film 18 may be made at least substantially of polyester, polyurethane and/or a fluoropolymer and have a thickness in the range of 25 μm to 300 μm inclusive. The film 18 is produced, for example, in approximately 19 cm wide strips and joined, for example by sewing, to the woven fabric 16 in suitable edge regions.

As FIG. 1 shows, if the airbag is activated and unfolded by the air entering as indicated by the direction arrows 12 and 14, the film 18 is lifted off the woven fabric 16 in regions other than the regions 20, 22 and 24, where the film 18 is not joined to the woven fabric 16, and expands. This results in the widening and opening of the through-openings 26a-l and thus in the flow of a large quantity or volume of air into the airbag within a short time.

At this point, it should be noted that the airbag is, by way of example, designed as a large airbag that is represented by the valve device 10 at least in certain regions. If the airbag is inflated and an occupant plunges into the airbag and thus into the valve device 10 from an outside 28 of the valve device 10 in the direction of the direction arrows 12, the film 18 comes to lie against the woven fabric 16, with the result that the film 18 expands less than when the air flows into the airbag and through the valve device 10. The woven fabric 16 therefore likewise provides a non-return function of the valve device 10, because in the plunging-in process a discharge or an excessively fast discharge of air from the airbag is prevented, which ensures a very good dwell time and therefore support function of the airbag. This is further supported by the fact that the through-openings 26a-l, which are placed on the inside 30 of the valve device 10 and thus of the airbag, which point away from the outside 28 and which are represented by perforations, point inwards and thereby support a sealing action, because they are compressed by the rising internal pressure in the airbag. This compression is due to the fact that each of the through-openings 26a-l has a projection 32a-l that points away from the woven fabric 16 in the direction of air flow as indicated by the direction arrows 12 and 14 as the air flows in.

Figure 2:
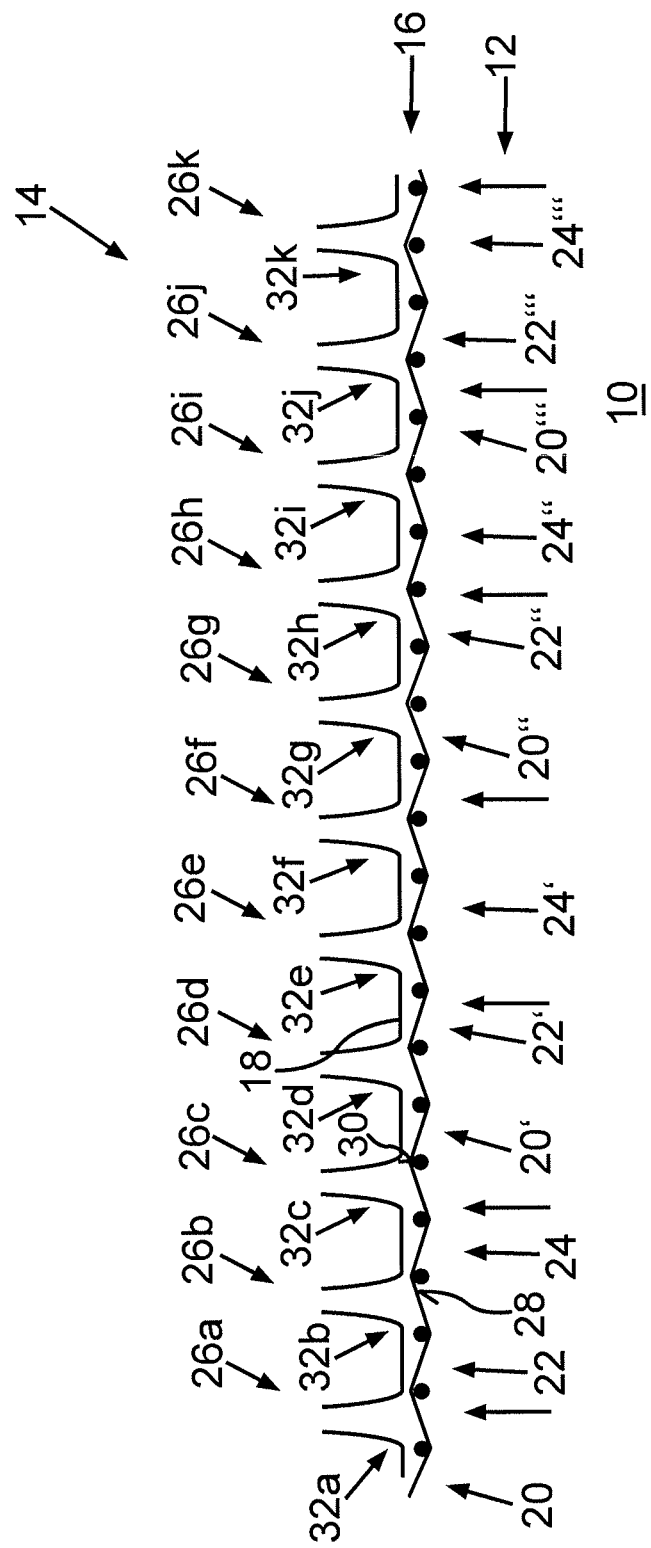
FIG. 2 is a diagrammatic sectional view of a further embodiment of the valve device according to the invention.

FIG. 2 shows an alternative embodiment of the valve device 10, identical elements being identified by the same reference numbers. The projections 32a-k of the through-openings 26a-k are now designed as substantially tubular projections, each having a tapering region which tapers from the woven fabric 16 towards the inside 30, i.e., parts of the projections 32a-k are conical.

To form such a surface pattern, the film 18 is for example designed as a thermoplastic elastomer film and deep-drawn. Production using a plastic molding process is also possible.

In the valve device 10 according to FIG. 2, the film 18 is likewise joined to the woven fabric 16, for example by bonding and/or sewing, in regions 20, 20', 20'', 20''', 22, 22', 22'', 22''', 24, 24', 24'' and 24'''. Apart from that, the explanations given for the valve device according to FIG. 1 apply to the valve device according to FIG. 2 as well. The valve device according to FIG. 2 likewise allows a particularly fast opening and closing and therefore a fast flow of large quantities or volumes of air through the valve device 10 and into the airbag within a short time, because the through-openings 26a-l of the valve device 10 have a particularly low wall roughness, which affects a pressure loss coefficient. This allows a particularly high flow rate of the air flowing through or in and a very good sealing action when the woven fabric 16 is loaded by the occupant plunging in.

Figure 3:
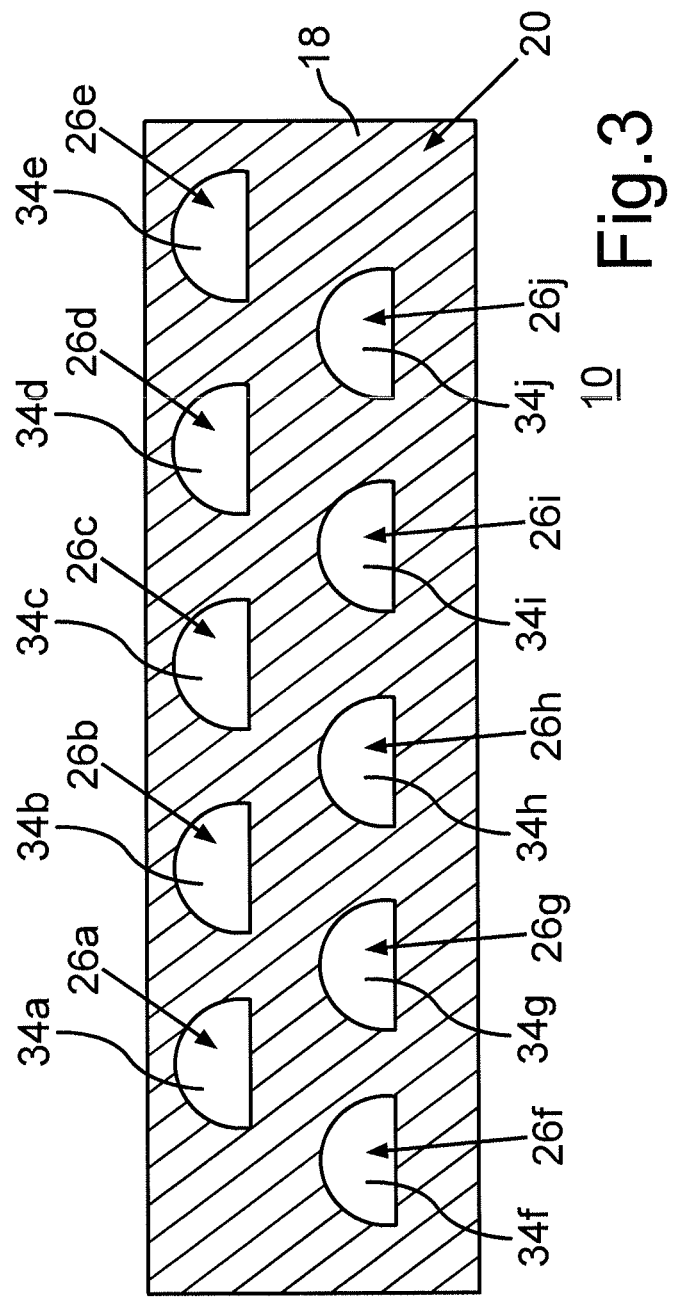
FIG. 3 is a diagrammatic top view of a further embodiment of the valve device according to the invention.

FIG. 3 shows a further embodiment of the valve device 10, the film 18 being shown diagrammatically in FIG. 3. In the hatched region 20, the film 18 is bonded to the woven fabric 16 (not shown in FIG. 3). The film 18 can also be joined to the woven fabric 16 by sewing. Each of the through-openings 26a-j of the film 18 is covered by a flap element 26a-j formed by the film 18 and therefore integral with the film 18, being represented by suitable flap-shaped perforations of the foil 18. The bow-shaped flap elements 26a-j are produced, for example, by stamping. The flap elements 26a-j covering the through-openings 34a-j are not bonded or otherwise joined to the woven fabric 16, so that they free the through-openings 34a-j in the passage position of the valve device 10 and let air flow through the valve device 10 and into the airbag while at least substantially preventing a discharge of air in the closed position of the valve device 10. Apart from that, the explanations offered with respect to the previous figures apply to the valve device 10 according to FIG. 3 as well.

FIG. 4 shows a further embodiment of the valve device 10, wherein passage regions 36a-g ensure that air can flow through the valve device 10 and therefore into the airbag. FIG. 4 shows a plurality of film strips 40a-f, each having a defined strip width 38a-f. The film strips 40a-f can therefore be considered as individual films that are joined, e.g., bonded, to the woven fabric 16 in the hatched regions 20, 20', 22, 22', 24 and 24'. In the passage regions 36a-g the film strips 40a-f are not joined to the woven fabric 16 and let air flow through the valve device 10 and into the airbag in the passage position of the valve device 10. As the film strips 40a and 40b in the passage region 36b, the film strips 40b and 40c in the passage region 36c, the film strips 40c and 40d in the passage region 36d, the film strips 40d and 40e in the passage region 36e and the film strips 40e and 40f in the passage region 36f overlap one another, the tightness of these passage regions 36b-f is increased in the closed position of the valve device 10 and a flow through and a discharge of air from the airbag is prevented or at least restricted further, thereby increasing the dwell time of the airbag.

FIG. 5 shows the outside 28 of the valve device 10 according to the preceding figures, where the occupant, in particular his/her head, contacts the airbag and thus the woven fabric 16 of the valve device 10.

FIG. 6 shows a section of the inside 30 of the valve device 10 according to FIG. 3, showing a plurality of bow-shaped flap elements 34a-j. Each of the flap elements 34a-j has a surface area of approximately 44 mm$^2$, resulting in various patterns in an opening cross-section of 34% to 44% inclusive of the total surface area of the valve device 10.

FIG. 7 shows the valve device 10 according to FIG. 4, showing the substantially rectangular film strips 40a-c, which are joined to the woven fabric 16 in the manner described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A valve device for a gaseous medium of an airbag, the valve device comprising:
    a woven fabric textile layer, at least certain regions of which are permeable with respect to the medium; and
    at least one film that covers the textile layer in at least one region and which forms at least one passage region of the valve device, the at least one passage region is configured so that it is at least substantially closed in a closed position of the valve device and open at least in certain regions in a temporary passage position of the valve device,
    wherein the at least one passage region is configured as at least one through-opening of the film,
    wherein the at least one through-opening of the film is a perforation, and
    wherein the perforation has, at least in certain regions, a projection pointing away from the textile layer in an edge region of the through-opening.

2. The valve device according to claim 1, wherein the film is bonded or sewn to the textile layer via spaced connecting regions.

3. The valve device according to claim 1, wherein the projection is continuous in a circumferential direction of the at least one through-opening at least in certain regions and is at least substantially tubular.

4. The valve device according to claim 3, wherein the projection has a tapering region.

5. An airbag for a motor vehicle, comprising:
    an airbag; and
    a valve device for the airbag, the valve device comprising
        a woven fabric textile layer, at least certain regions of which are permeable with respect to the medium; and
        at least one film that covers the textile layer in at least one region and which forms at least one passage region of the valve device, the at least one passage region is configured so that it is at least substantially closed in a closed position of the valve device and open at least in certain regions in a temporary passage position of the valve device,
        wherein the at least one passage region is configured as at least one through-opening of the film,
        wherein the at least one through-opening of the film is a perforation, and
        wherein the perforation has, at least in certain regions, a projection pointing away from the textile layer in an edge region of the through-opening.

6. The airbag according to claim 5, wherein the film is bonded or sewn to the textile layer via spaced connecting regions.

7. The airbag according to claim 5, wherein the projection is continuous in a circumferential direction of the at least one through-opening at least in certain regions and is at least substantially tubular.

8. The airbag according to claim 7, wherein the projection has a tapering region.

* * * * *